United States Patent [19]
Hotchkiss et al.

[11] 3,730,453
[45] May 1, 1973

[54] EARLY END OF TAPE DETECTION

[75] Inventors: Stuart E. Hotchkiss, Williamson; Bruce H. Smith, Rochester; Paul L. Stefko, Jr., East Rochester, all of N.Y.

[73] Assignee: Xerox Corporation, Stamford, Conn.

[22] Filed: Sept. 21, 1970

[21] Appl. No.: 74,084

[52] U.S. Cl. .................242/191, 242/57, 242/186
[51] Int. Cl. ........................G11b 15/54, B65h 25/32
[58] Field of Search.......................242/191, 186, 57

[56] References Cited

UNITED STATES PATENTS

| | | | |
|---|---|---|---|
| 3,488,017 | 1/1970 | Schatteman | 242/191 |
| 3,297,266 | 1/1967 | Rumple | 242/186 |
| 3,511,451 | 5/1970 | Emmert | 242/57 |
| 3,498,568 | 3/1970 | Blaschke | 242/191 |

FOREIGN PATENTS OR APPLICATIONS 998,468    7/1965    Great Britain..................242/186

Primary Examiner—George F. Mautz
Attorney—James J. Ralabate, Benjamin B. Sklar and John E. Beck

[57] ABSTRACT

Apparatus for indicating a predetermined position on a recording medium such as a magnetic tape. Such a predetermined position is representative of the amount of usable recording medium remaining on a supply reel from which the tape is spooled. The apparatus is characterized by the provision of a photodetector for generating a series of pulses, the frequency of which varies in accordance with the change in angular velocity of the supply reel. The period between successive pulses generated by the photodetector is compared to the operating time of a one-shot multivibrator and when the former is equal to or less than the latter an output signal is derived which can be used to alert an operator that a predetermined quantity of tape remains or actuate control circuitry.

9 Claims, 3 Drawing Figures

INVENTORS
STUART E. HOTCHKISS
BRUCE H. SMITH
PAUL L. STEFKO, JR.
BY

EARLY END OF TAPE DETECTION

BACKGROUND OF THE INVENTION

This invention relates, in general, to position sensing in conjunction with a record medium and, more particularly to position sensing structure adapted for varying a predetermined point or points of the record medium, which are to be sensed.

In the process of magnetic tape recording, it is desirable to automatically detect predetermined positions on the tape, one position being the end of the tape, in order to prevent disengagement of the tape leaders from either the supply reel or the take-up reel. Another predetermined position is indicative to usable tape remaining on the supply reel during a recording process. Detection of the last-mentioned position is useful in preventing loss of data transmitted when the quantity yet to be transmitted exceeds the amount of usable tape remaining on the supply reel.

Prior art systems for accomplishing the foregoing include mechanical counters, electronic counters, footage meters and other "external" devices. Other systems, considered to be improvements over the foregoing, rely on special markings on the tape, for example, reflective spots or clear areas at the predetermined position on the tape which cause light impingement on a photodetector, as the spot or clear area passes a light source. The clear areas in the tape proper are usually formed by punching holes therein or removing oxide coating from the base material. Magnetic tape leaders are also utilized in the foregoing manner since they may be transparent.

While the provision of reflective spots or clear areas in a magnetic tape, and photodetector means for sensing them, provide satisfactory results, they impose certain limitations. For example, it may be necessary to open the cassette or other housing for the tape in order to modify the tape according to the requirements of a particular system in which it is to be used. Moreover, since these modifications are somewhat permanent, a particular predetermined position cannot, if at all, be easily changed.

BRIEF DESCRIPTION OF THE INVENTION

In accordance with the present invention, adaptation or modification of the tape is not required. Moreover, a predetermined position or positions to be sensed may be readily varied.

To these ends, structure is provided for continuously monitoring the angular velocity of a tape spindle to thereby produce output signals, the frequency of which varies in accordance with the change in angular velocity of the spindle and comparing the frequency of the output signal to the output of a reference device having a predetermined operating time. The outputs are compared for coincidence, whereupon an output signal proportional to the amount of tape remaining on the supply reel is produced. This is accomplished by providing one or more detectable points on the supply spindle, and a corresponding detector which electronically produces a signal when the point is detected, the time between successive signals becoming less as the amount of tape remaining on the supply spool becomes less. When the period between two pulses of the varying signals becomes equal to or less than the operating time of the reference device a signal is derived which indicates that a predetermined amount of the tape remains. Such a signal can be utilized in a number of ways, for example, it can be used to light an indicator lamp on a control panel to warn the operator that a predetermined amount of data can be placed onto the tape without loss of data.

DESCRIPTION OF THE PREFERRED EMBODIMENT OF THE INVENTION

Figure 1:
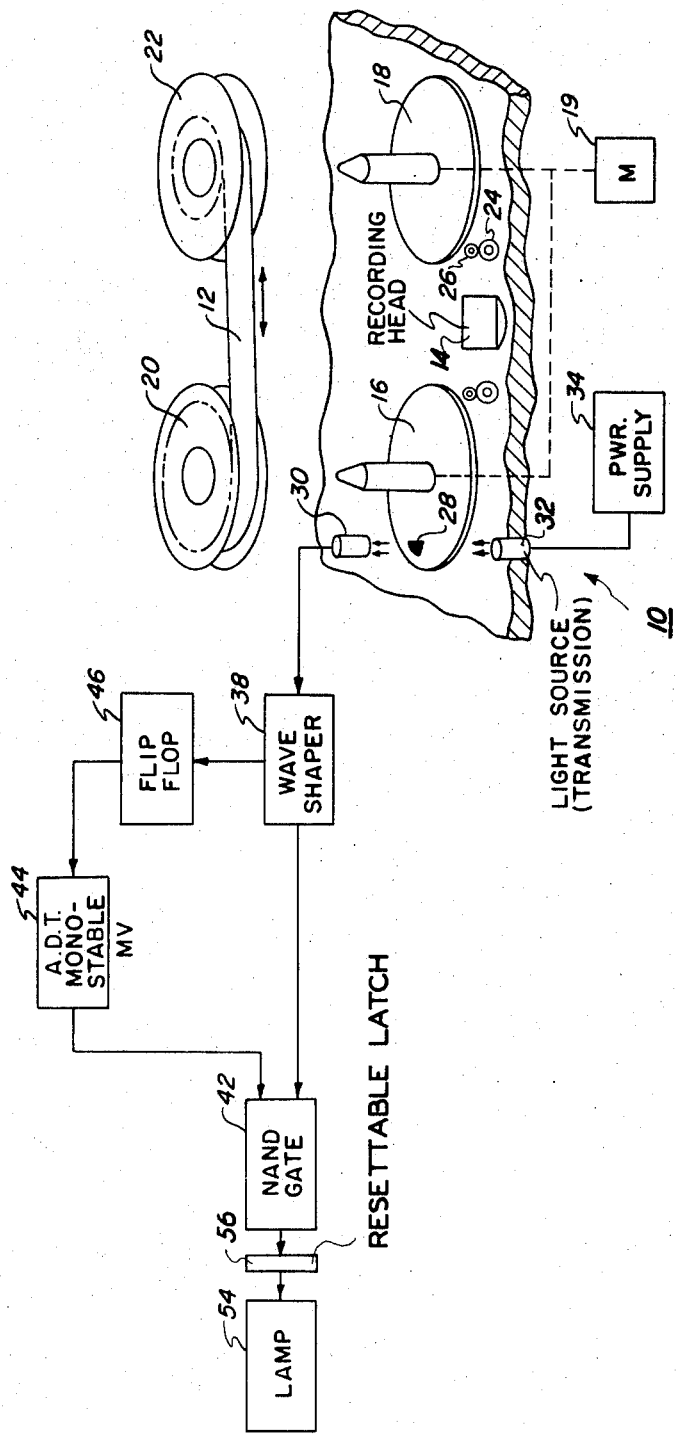
FIG. 1 is a diagrammatic view of a tape transport and tape position detector representing the invention.

Referring to FIG. 1, reference character 10 designates generally a tape transport adapted for use in conjunction with a data communications terminal printer) of the type employed in a high-speed multipoint message and data-handling system. Such systems employ both "on-line" and "local" modes of operation, the former of which permits data transfer between the computer and keyboard printer preferably via a buffer storage device and the latter of which permits data to be transferred from the keyboard to recording paper preferably via the aforementioned buffer device onto which messages are visibly produced or, alternatively, to other devices such as magnetic tape, both of which are physically located at the terminal.

In the transfer of data from a terminal to the computer, the latter is employed as a message processing device which relays the message from one terminal to another. In a system where magnetic tape is employed, messages can be transferred from the tape to the computer and vice-versa. From the foregoing, it can be seen that data can be transferred to magnetic tape or recording paper either, directly from the keyboard via the buffer device during a "compose" mode of operation, or from the magnetic tape via the buffer device. The advantage of the tape feature resides in the fact that in the "on-line" mode of operation the terminal can be left unattended, yet communication between terminals can be had through polling of the terminal by the computer.

When the magnetic tape is utilized, the tape transport 10 is operative to spool magnetic tape 12 past a magnetic read/write head 14. During writing, coded input representative of alphanumeric characters selected from a keyboard (not shown) are placed on the tape 12 in predetermined data block lengths of, for example, 512 characters. Data transmission is accomplished through a buffer storage system (not shown) in order that the coded inputs are uniformly placed on the tape. In this manner a stream of data up to a maximum of 512 characters in length is transmitted at a time. Accordingly, it is necessary to have a usable amount of tape remaining, at least equal to the length of one data block, in order for data to be transmitted without loss of information.

The tape transport comprises a supply spindle 16 and a take-up spindle 18 which are operatively connected to an AC synchronous drive motor 19 having an operating speed of 1800 rpm. The tape 12 is conveniently transported from a pay-out or supply reel 20 to a take-up reel 22 by means of a capstan drive 24 operatively associated with a pinch roller 26. The capstan serves to move the tape past the read/write head at a uniform speed of about 4 inches per second. The tape is removed from the supply reel at the same rate, consequently, the angular velocities of the supply reel and spindle 16 continuously change from a relatively low value when the reel is full to a relatively higher value when the reel approaches its empty condition. Suitable drive arrangements (not shown) interconnecting the spindle 16 and 18 with the motor 19 cooperate with the capstan to rotate either the supply reel or the take-up reel depending on the direction of movement of the tape.

Figure 2:
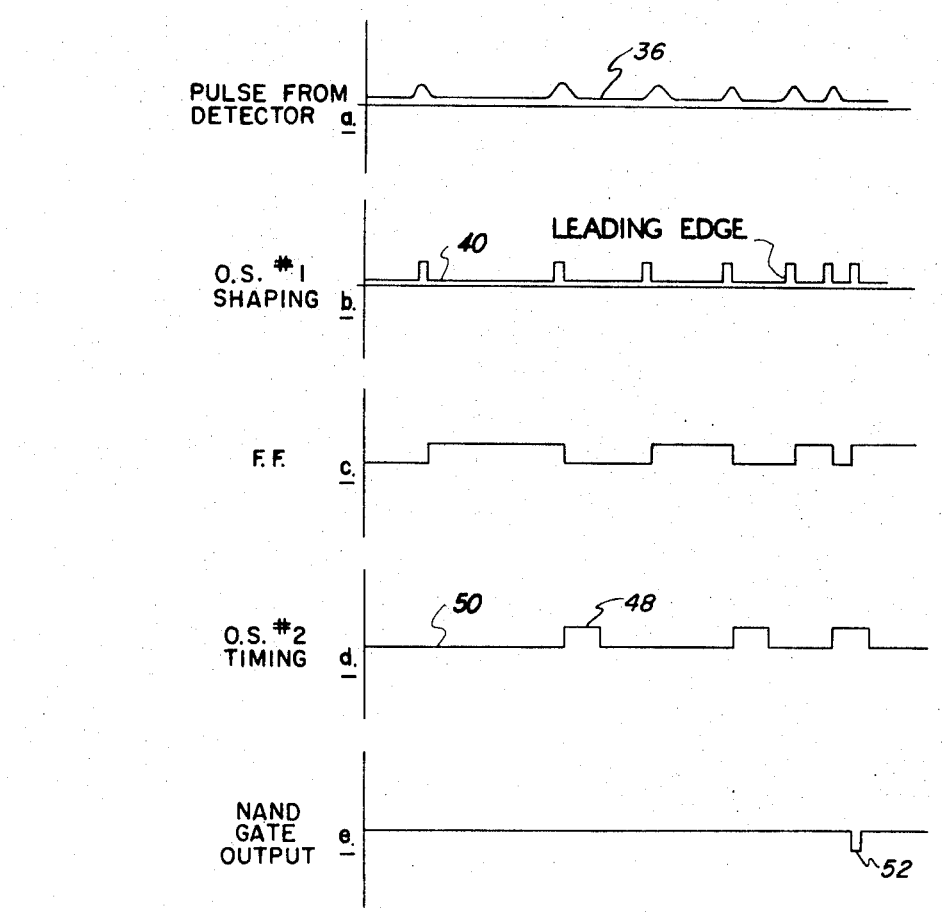
FIGS. 2 a – e are graphs of waveforms vs. time depicting the outputs from the various components forming a part of the tape position detector shown in FIG. 1.

In one embodiment of the invention, as illustrated in FIG. 1, the supply spindle 16 is provided adjacent its outer edge with an aperture 28. Positioned on one side of the spindle in line with the circumferential path of movement of the aperture 28 is a detector which may, for example, comprise a phototransistor 30. On the opposite side of the spindle a lamp 32 is positioned relative to the detector and the path of travel of the aperture such that illumination therefrom impinges upon the detector each time the aperture passes therebetween. A suitable power source 34 is provided for energization of the lamp 32. The effect of such an arrangement is to generate, as illustrated in FIG. 2, a series of pulses, indicated at 36, the frequency of which is a function of the spindle's angular velocity. Due to the varying angular velocity of the spindle, the frequency of the pulses generated by the detector varies and, therefore, becomes higher as the amount of tape remaining on the supply reel 20 becomes less.

The pulses generated by the photodetector 30, which may be generated by other transducers, for example, a Hall effect device, are suitably shaped by a wave-shaping device, for example, a one-shot multivibrator 38 thereby forming a square wave output as indicated at 40, in FIG. 2. The output from the multivibrator 38 is fed directly to a logic device such as a Nand gate 42 and indirectly to an adjustable one-shot multivibrator 44, via a flip-flop 46. The flip-flop serves to provide a single triggering pulse to the multivibrator 44 for every two pulses from the photo-detector. Such an arrangement provides for sufficient recovery time after triggering for the multivibrator 44. The operating time of the adjustable one-shot multivibrator 44 represented by the positive portion 48 of the square wave output therefrom, indicated at 50 (FIG. 2), is adjusted such that there is coincidence of pulses or signals at the inputs to the Nand gate when a predetermined frequency of output pulses from the photodetector is reached, which frequency represents a predetermined quantity of tape remaining on the supply reel. The output signal of the Nand gate, indicated by the negative pulse 52, is, in accordance with the present invention, employed to energize the lamp 54 via a resettable latch 56 thereby providing a visual signal, prominently displayed, which warns the operator that only one more block of data can be placed on the magnetic tape without loss of information.

It will be appreciated that the operating time of the multivibrator 44 can be made longer or shorter in accordance with the particular position on the tape to be detected. This is simply accomplished by varying the reactance value of the multivibrator circuit in order to shorten or lengthen its operating time.

Figure 3:
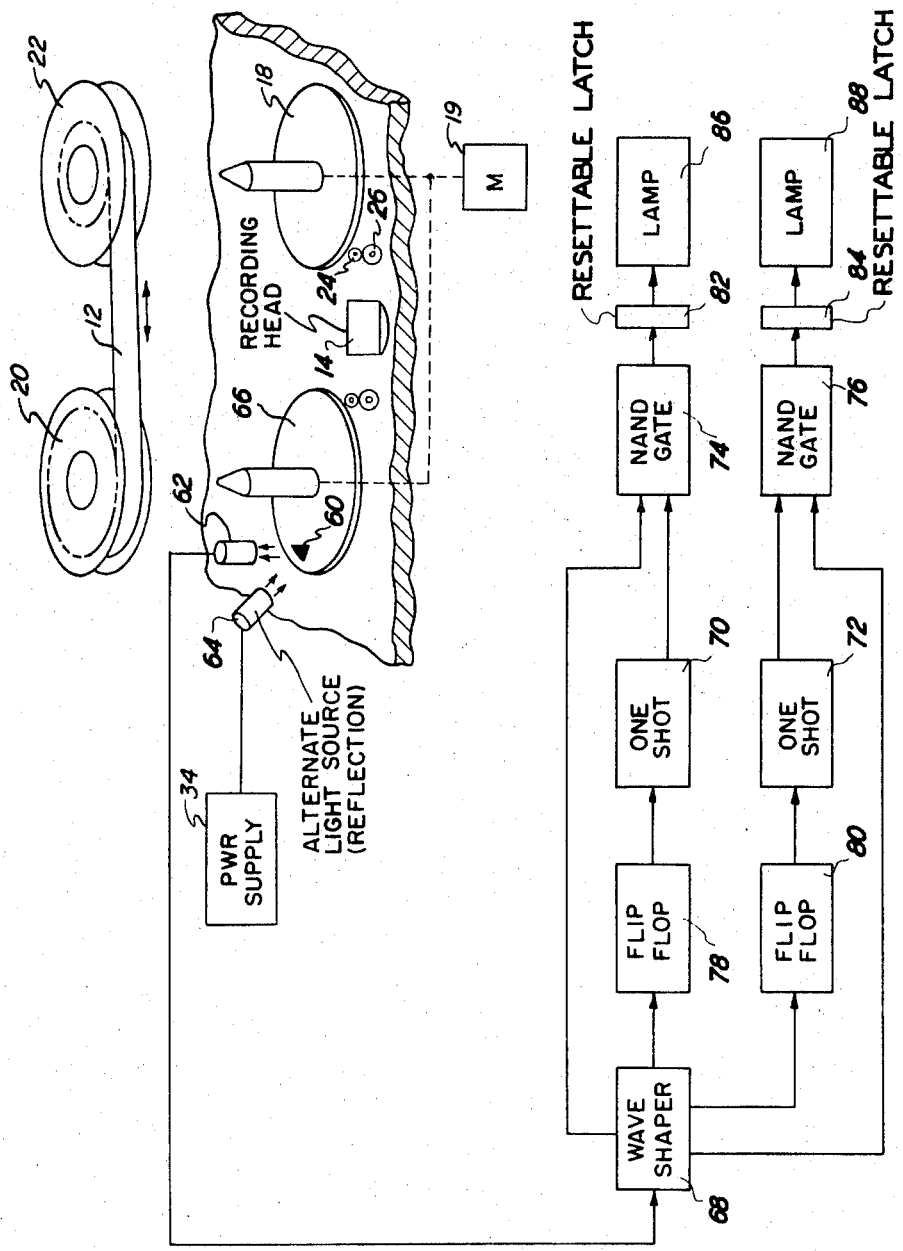
FIG. 3 is a modified form of the invention shown in FIG. 1.

A modified form of the invention, as disclosed in FIG. 3, differs from the embodiment shown in FIG. 1, in the structure for generating the varying signal and further, in the capability of indicating more than one position on the tape. The embodiment functions exactly the same as that shown in FIG. 1, however, the aperture 28 is replaced by a specular surface 60 and the location of the photodetector 62 and light source 64 are at the same side of the spindle 66 and are so oriented that the photodetector is in a position to intercept light emanating from the light source and deflected by the specular surface 60. The foregoing pulse generating arrangement could also be employed in the embodiment of FIG. 1.

The embodiment of FIG. 3, in addition to having a wave shaping multivibrator 68 to which the pulses generated by the photodetector are directed, comprises a pair of timing multivibrators 70 and 72 having different operating times. A pair of logic elements in the form of Nand gates 74 and 76 receive pulses directly from the waveshaper 68 while receiving a second input indirectly via one of the multivibrators 70 and 72. A pair of flip-flops 78 and 80 interact with the multivibrators 70 and 72 in the same manner as the flip-flop 46 interacts with the multivibrator 44, as discussed hereinabove.

The outputs from the Nand gates 74 and 76 are employed via resettable latches 82 and 84 to illuminate lamps 86 and 88. While the present invention has been described with reference to the particular structure disclosed herein, it is not intended that it be limited to the specific details and this application is intended to cover such modifications or changes as may come within the purposes or improvements or scope of the claims forming a part hereof. For example, a plurality of apertures 28 or specular surfaces 60 could be used in conjunction with their respective spindles to thereby increase the operating efficiency of the system. Obviously, it would be necessary to change the operating time of the multivibrator in accordance with the number of apertures or specular surfaces employed. The effect of using a plurality of such devices, as mentioned above, improves the efficiency of the system in that the amount of tape remaining can be measured to a closer degree.

What is claimed is:

1. In a record media transport system including means for spooling the record media from a supply reel supported by a spindle, the improvement comprising:

means for generating a series of pulses the time between adjacent pulses being representative of the amount of record media remaining on the supply reel, means for generating a reference signal, said reference signal having a predetermined duration, and means for producing an output signal when the time between adjacent ones of said pulses does not exceed the duration of said reference signal, said output signal being representative of a predetermined quantity of record media remaining on said reel.

2. Structure as specified in claim 1, wherein said means for generating a varying signal comprises a phototransistor, light source and means forming an integral part of said spindle for causing illumination from said light source to impinge on said phototransistor at least once per each revolution of said spindle.

3. Structure as specified in claim 2 wherein said means for generating a reference signal comprises a monostable multivibrator.

4. Structure as specified in claim 1 wherein, said means for generating a reference signal is adjustable to thereby vary the duration of said reference signal, rendering said reference signal generating means capable of generating different signals for producing a plurality of different outputs from said output signal means representative of different predetermined amounts of record media remaining on said supply reel.

5. Structure as specified in claim 1 including means for varying said predetermined duration whereby different predetermined lengths of tape remaining can be represented.

6. In a magnetic tape transport system including means for spooling magnetic tape from a spindle supported supply reel, past a read/write head, the improvement comprising:
   means for generating a varying signal representative of the amount of tape remaining on said supply reel,
   means for generating a plurality of reference signals each having a different predetermined time duration,
   means for providing a plurality of output signals, each representing a different predetermined quantity of magnetic tape remaining on said supply reel.

7. Structure as specified in claim 6 wherein, said means for generating a varying signal comprises a phototransistor, light source and means integral with said spindle for causing illumination from said light source to actuate said phototransistor at least once per each revolution of said spindle.

8. Structure as specified in claim 7 wherein, said means for generating a plurality of reference signals comprises a plurality of monostable multivibrators.

9. A tape transport comprising:
   a support spindle;
   a reel of magnetic tape supported on said spindle;
   means including a capstan drive for spooling said tape from said reel;
   means for generating a series of pulses, the time between adjacent pulses being representative of the amount of tape remaining on the supply reel;
   means for generating a reference signal having a predetermined duration, and
   means for producing an output signal when the period between successive pulses does not exceed the duration of said reference signal, said output signal being representative of a predetermined quantity of tape remaining on said reel.

* * * * *